United States Patent [19]

Morton

[11] Patent Number: 4,536,855
[45] Date of Patent: Aug. 20, 1985

[54] IMPEDANCE RESTORATION FOR FAST CARRY PROPAGATION

[75] Inventor: Steven G. Morton, Oxford, Conn.

[73] Assignee: International Telephone and Telegraph Corporation, New York, N.Y.

[21] Appl. No.: 452,596

[22] Filed: Dec. 23, 1982

[51] Int. Cl.³ .............................................. G05F 7/50
[52] U.S. Cl. .................................................... 364/786
[58] Field of Search ............... 364/768, 783, 784, 786, 364/787, 780, 788; 377/77, 115–117, 49, 76; 307/602, 603, 455

[56] References Cited

U.S. PATENT DOCUMENTS

| | | | |
|---|---|---|---|
| 3,654,394 | 4/1972 | Gordon | 307/243 |
| 3,728,532 | 4/1973 | Pryor | 364/787 |
| 3,766,371 | 10/1973 | Suzuki | 364/784 |
| 3,925,651 | 12/1975 | Miller | 364/787 |
| 4,052,604 | 10/1977 | Maitland et al. | 364/786 |
| 4,229,803 | 10/1980 | Rhodes | 364/787 |
| 4,357,675 | 11/1982 | Freyman | 364/786 |
| 4,504,749 | 3/1985 | Yoshida | 307/602 |

Primary Examiner—James D. Thomas
Assistant Examiner—Dale M. Shaw
Attorney, Agent, or Firm—John T. O'Halloran; Jeffrey P. Morris

[57] ABSTRACT

An improved circuit for performing high speed arithmetic computations is described, and includes a mechanism for dynamically deleting faulty data bits in a configuration for minimizing propagation delay paths. The invention is particularly applicable to an associative processor wherein the data word length and rate of flow of data may vary from one instruction to the next. In accordance with the invention, data propagation delay time is minimized as is the number of required circuit interconnections, thereby making the invention easily manufacturable on an LSI chip. The advantages of the circuit design are multiplied in an associative processor, since such processors are highly reconfigurable and must be able to exclude unwanted bits from an arithmetic operation, to change data word sizes and to delete failed bits. The present invention is advantageously implemented in arithmetic carry circuits and in cascaded multiplexer logic circuits, which may effectively be implemented in MOS (metal oxide semiconductor) integrated circuits, or in CMOS (complementary MOS) integrated circuits in which a plurality of stages of such circuits must be connected in series, i.e. eight, sixteen, thirty-two, etc., while still providing a rapid execution speed.

15 Claims, 8 Drawing Figures

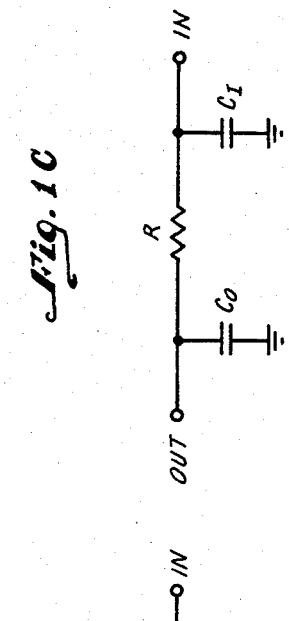
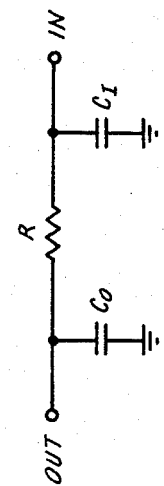
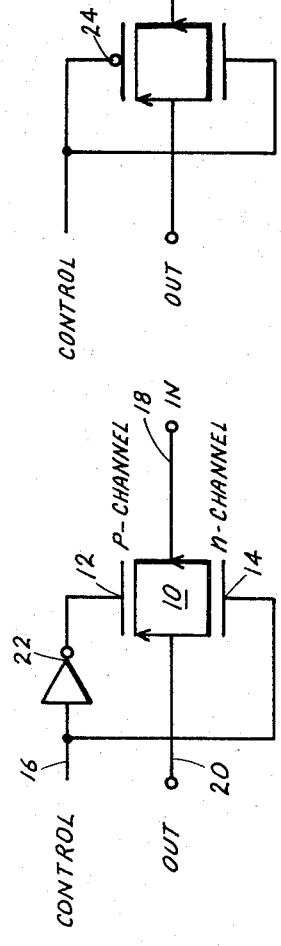
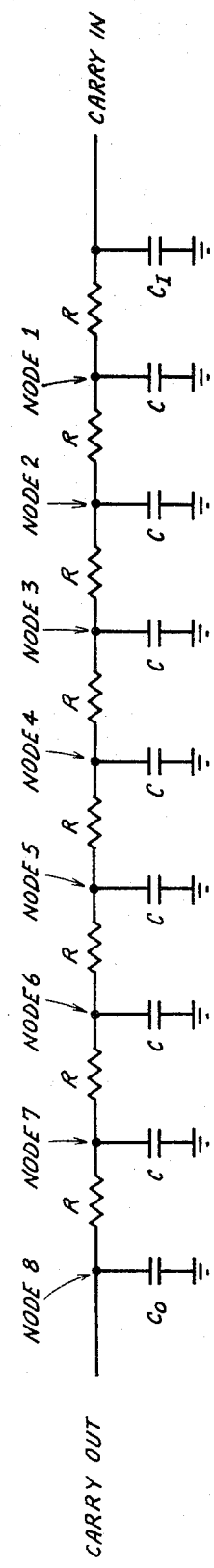

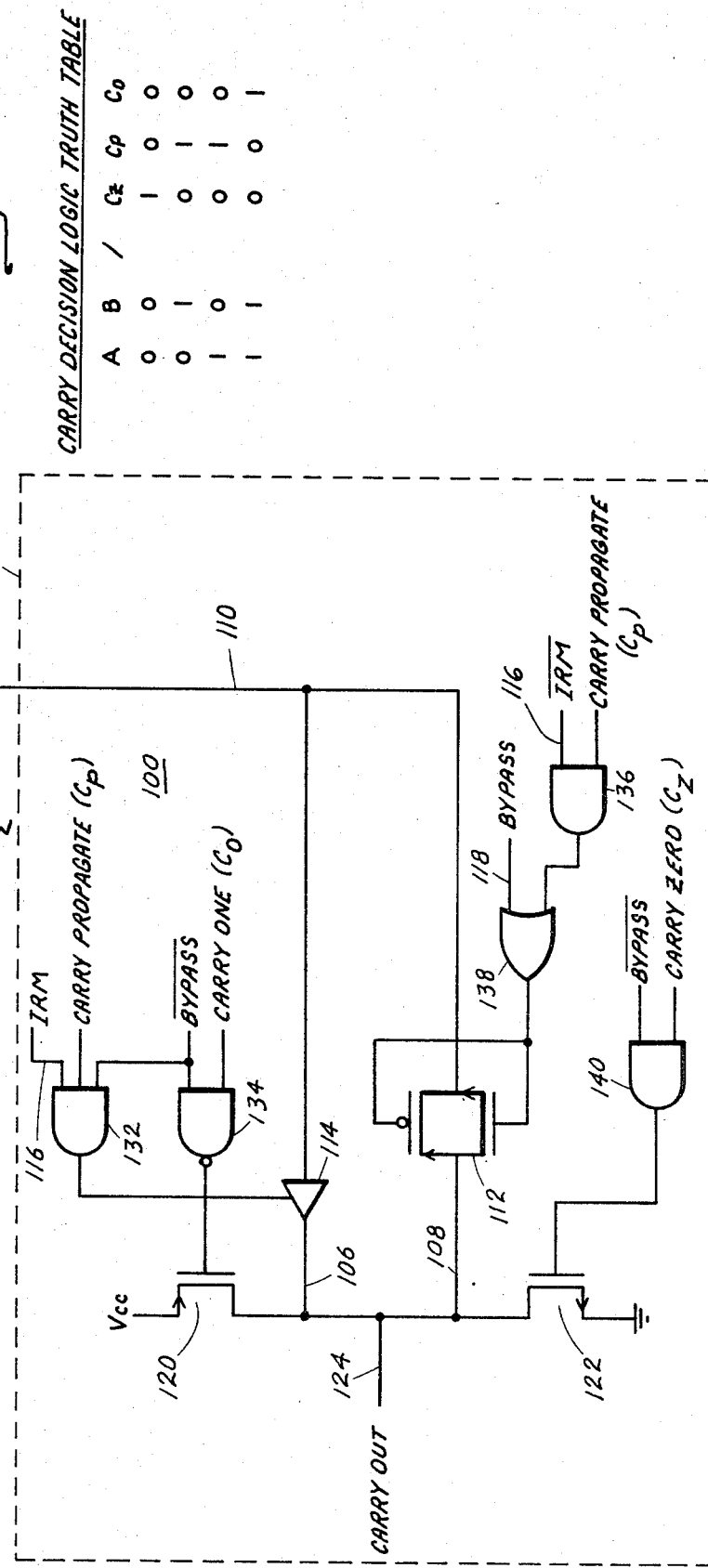

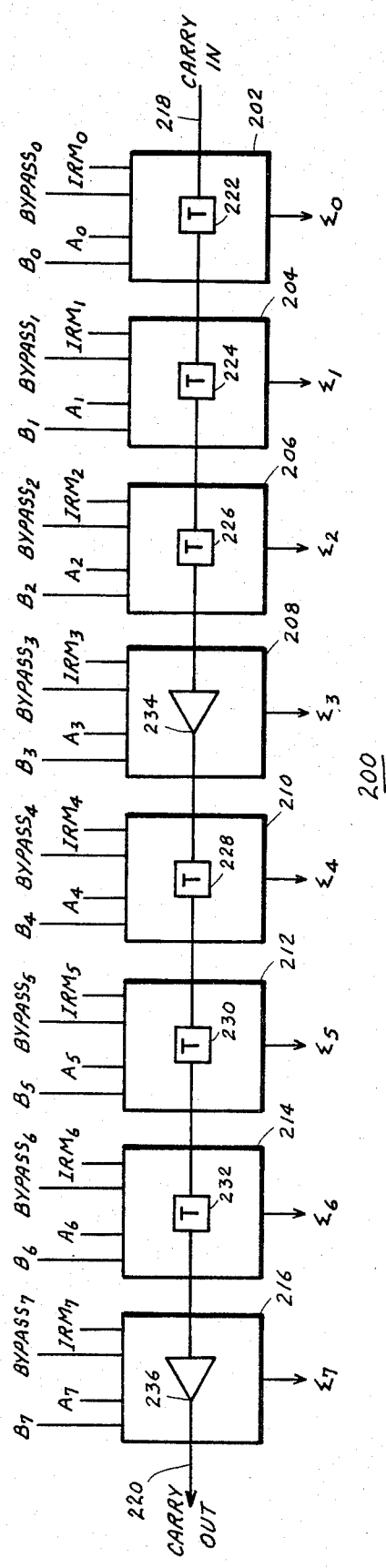
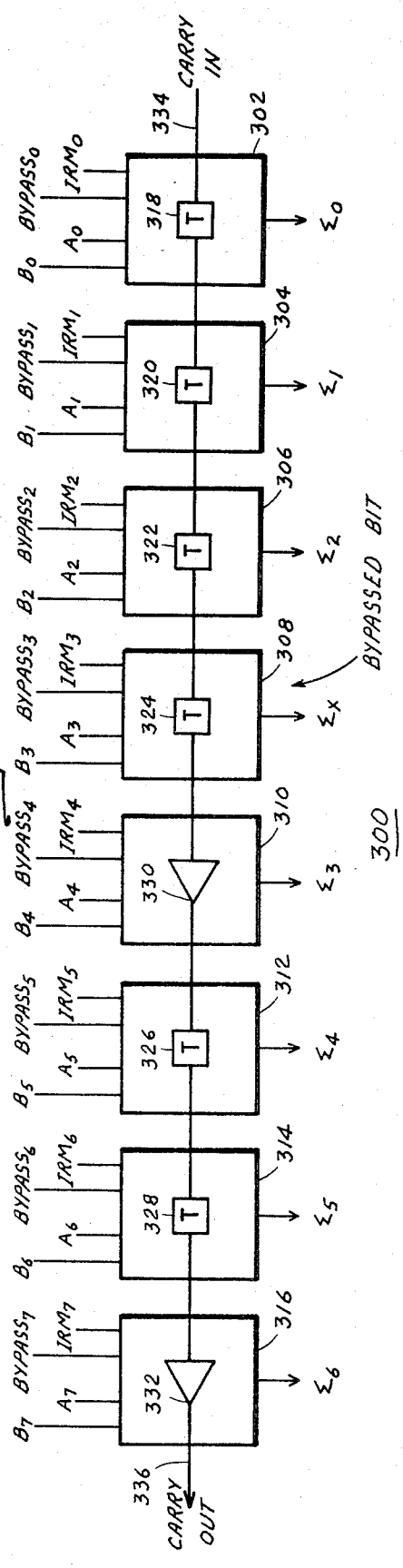

IMPEDANCE RESTORATION FOR FAST CARRY PROPAGATION

CROSS REFERENCE TO RELATED APPLICATION

J. M. Cotton, Ser. No. 404,242, filed Aug. 2, 1982, "Associative Processor With Variable Length Fast Multiply Capability".

BACKGROUND OF THE INVENTION

1. Field of the Invention

The present invention relates generally to high speed digital logic circuitry in which digital signal propagation delay is greatly reduced. The invention is applicable to any serial connection of digital logic circuits, such as carry circuits and to multiplexers in series. The invention is particularly applicable to associative processors in which large numbers of carry circuits or multiplexers are connected in series.

2. Description of the Prior Art

It is known in the art that it is advantageous to minimize the number of connections between arithmetic cells in a processor, such as an associative processor, in order to minimize interconnection and propagation delay problems. The typical arithmetic adder implementation, a carry look ahead circuit, requires many data paths, so it cannot always be effectively used where fast execution time is required. No such look ahead technique exists in the known prior art for a circuit with a large number of multiplexers in series.

Another known solution to carry circuits is the Manchester carry circuit, which takes advantage of the "pass transistor" structure in MOS circuits. A pass transistor, which simply passes its input to its output, in each bit of an adder, is turned on when the carry into a bit should be propagated to the carry out of the bit, i.e. when only one of the two parallel inputs to the adder is true. A carry into the cell can thus be rapidly directed to the carry output of the cell because all of the carry propagate decisions can be made simultaneously, by a circuit that looks at the parallel inputs to the adder. The drawback of this known technique is the relatively high impedance of the pass transistor in the active state. As the number of bits through which carry is propagated increases, the distributed capacitance, along with the increasing impedance of the string of pass transistors, greatly slows down circuit operation.

Associative processors are processors which operate on many data objects simultaneously rather than sequentially as in a conventional processor. Such an associative processor may be comprised of an array of single bit computers implemented in LSI. Such cellular computers obey the same instruction simultaneously, each operating on its own data.

The cells in a row of the associative processor array can be dynamically (from one instruction to the next) configured into an arbitrary number of fields of arbitrary defined length (within the constraints of the width of the array). Each field can then operate independently as if it were a separate computer of the given word length, able to perform arithmetic and logical operation. These fields can all obey the same instruction simultaneously, or they may be selectively disabled under program control.

An example of an associative processor cell architecture of the type which may effectively utilize the present invention is described by the cross-referenced co-pending application Ser. No. 404,242 to which reference may be made for details of an associative processor; however, it is to be understood that the present invention is applicable to other associative processor structures.

U.S. Pat. No. 3,728,532, Carry Skip-Ahead Network, describes carry networks having a power-of-2 number of bits in which the number of connections between cells increases as the number of skipped bits increases, being four for a 4-bit block, thus increasing the cost of interconnection. U.S. Pat. No. 3,654,394, Field Effect Transistor Switch, Particularly for Multiplexing, described multiplexing analog signals. U.S. Pat. No. 3,925,651, Current Mode Arithmethic Logic Array shows a 4-bit arithmetic and logical unit built of current mode logic. U.S. Pat. No. 4,229,803, $I^2L$ Full Adder and ALU, shows an $I^2L$ arithmetic and logic unit.

SUMMARY OF THE INVENTION

The present invention describes an improved circuit for performing high speed arithmetic computations, and includes a mechanism for dynamically deleting faulty data bits in a configuration for minimizing propagation delay paths. The invention is particularly applicable to an associative processor wherein the data word length and rate of flow of data may vary from one instruction to the next. In accordance with the invention, data propagation delay time is minimized as is the number of required circuit interconnections, thereby making the invention easily manufacturable on an LSI chip. The advantages of the circuit design are multiplied in an associative processor, since such processors are highly reconfigurable and must be able to exclude unwanted bits from an arithmetic operation, to change data word sizes and to delete failed bits. The present invention is advantageously implemented in arithmetic carry circuits and in cascaded multiplexer logic circuits, which may effectively be implemented in MOS (metal oxide semiconductor) integrated circuits, or in CMOS (complementary MOS) integrated circuits in which a plurality of stages of such circuits must be connected in series, i.e. eight, sixteen, thirty-two, etc., while still providing a rapid execution speed.

It is therefore a primary object of the present invention to provide an improved digital processing configuration having a minimized digital signal propagation delay.

It is another object of the invention to provide an improved associative processor cell structure.

It is another object of the invention to minimize the number of connections required between arithmetic cells in a processor.

It is another object of the invention to provide an improved CMOS adder cell.

It is another object of the invention to provide an improved circuit for excluding faulty data bits.

It is another object of the invention to provide an associative processor having a rapid execution speed and in which unwanted or faulty data bits are excluded.

It is yet another object of the invention to configure a series of processing cells or stages in a dynamic grouping to minimize digital signal propagation delay and to operate effectively on arbitrarily chosen data word sizes, the bit length of which words may be readily changed.

It is yet another object of the invention to provide a circuit implementation of the foregoing objects in MOS LSI technology, requiring only a single connection between cells, and permitting selected cells in an associative processor to be left out of an arithmetic operation.

The foregoing objects and other features and advantages of the invention will become apparent with reference to the following detailed description thereof, taken in conjunction with the accompanying drawings, wherein:

BRIEF DESCRIPTION OF THE DRAWINGS

FIG. 1A is a schematic of a known CMOS transmission gate.

FIG. 1B is a simplified representation of the schematic of FIG. 1A.

FIG. 1C is a schematic of a lumped circuit model of a known transmission gate.

FIG. 2 is a simplified schematic equivalent circuit of a known worst case transmission gate carry circuit.

FIG. 3A is a basic adder cell in accordance with the present invention.

FIG. 3B is a Carry Decision Logic Truth Table of the adder cell of FIG. 3A.

FIG. 4 is a multiple bit adder comprised of eight basic adder cells of the type illustrated by FIG. 3A.

FIG. 5 is a multiple bit adder with a bypassed bit in accordance with the present invention.

DESCRIPTION OF THE PREFERRED EMBODIMENTS

FIGS. 1A, 1B and 1C are illustrative of conventional circuit representations used in describing CMOS transmission gates. FIG. 1A is a schematic of an explicit inverter wherein the transmission gate 10 is comprised of two series pass transistors 12 and 14, with transistor 12 being p-channel and transistor 14 being n-channel. When the control line 16 is high (logic 1), either one of transistors 12 and 14 may conduct, depending upon the states of the input signal on line 18 and the output signal line 20, and presenting a relatively low impedance path from input 18 to output line 20. Under the aforementioned condition the CMOS transmission gate is considered active (ON). When the control line 16 is low (logic 0), both transistors 12 and 14 are OFF, and the input 18 is disconnected from the output 20 due to the high impedance presented by gate 10 under this condition. The inverter notation at 22 of FIG. 1A has been replaced by a small circle at 24 of FIG. 1B on the gate of transistor 12. The CMOS transmission gate of FIG. 1B is identical to that of FIG. 1A, and is shown to illustrate the inverter representation used at 24, and which is referred to as an implicit inverter. FIG. 1C illustrates a lumped circuit model of a CMOS transmission gate. Typically, for an active CMOS gate with minimum geometry and configured on an LSI (Large Scale Integration) chip having 4-micron design rules and a 5-volt input voltage, the capacitances Co an CI, are approximately equal to 0.5 picofarad (pF) and the resistance R is approximately equal to 1000 ohms. The foregoing is illustrative of conventional CMOS circuit representations, which will be utilized in describing applicant's invention.

Referring now to FIG. 2, a simplified equivalent circuit for a worst case CMOS transmission gate carry circuit is illustrated by a plurality of lumped circuit models in series, of the type shown by FIG. 1C. Such a series of transmission gates typically occurs in a long carry propagate chain. The capacitance C between each of nodes 1 through 8 to ground is equal to $C_I+C_o$. The resistive impedance R to charge C at node 1 is equal to $R+S$, where S is the source impedance. Similarly, the resistive impedance to charge C at Node 4 is $4R+S$, and so on for each node. Thus, it is apparent that the longer the chain, the greater the resistance to the charge becomes at each node down the chain. Thus the operating speed of the circuit decreases as the number of transmission gates in series increases.

There would be a constant impedance to drive each node if each transmission gate were replaced by a buffer circuit, such as 114 in FIG. 3A. Such a buffer, when active would present an impedance of approximately 1000 ohms to either ground or VCC, and the output would be the same state as the input. However, the propagation delay through a buffer is substantially longer than the propagation delay through an isolated transmission gate. Optimum performance can be derived through a combination of transmission gates and buffers.

Referring now to FIG. 3A, a basic adder cell in accordance with the present invention is illustrated generally at 100. A sum circuit 102 may be of conventional design, wherein the sum is true when one and only one of the three inputs A, B and Carry In is true, or when all three of the inputs are true. The carry circuit 104, uniquely provides a choice on lines 106 and 108 of carry propagation. Carry In data from line 110 may flow through either CMOS transmission gate pass transistors 112 or through buffer 114 depending upon the value of configuration dependent information IRM on line 116, and fault location information on line 118. Impedance Restoration Mask is symbolized by IRM and fault location information is denoted by Bypass. An Impedance Restoration Mask may be defined as a bit pattern that selects where buffers are to be used rather than transmission gates in order to minimize worst case propagation delays.

When IRM is true (logic 1), Bypass is false (logic 0), and A and B are such that carry should be propagated, in which case Carry Propagate is true, Carry In from line 110 is propagated through buffer 114, which provides a low impedance output on line 106. When IRM is false (logic 0), Carry In from line 110 is propagated through the pass transistors 112. In the event that Carry In is not propagated and Bypass is false (logic 0), a logic "one" or a logic "zero" is provided by transmission gate MOS transistor 120 or transmission gate MOS transistor 122, in accordance with conventional rules for carry generation. When Bypass on line 118 is true (logic 1), which is the case for either a faulty cell or for excluding a data bit from the computation, Carry In from line 110 is coupled to Carry Out on line 124 via the fastest path (the path with the least propagation delay), which is the pass transistors 112.

Carry decision logic circuit 130 is a logic circuit which implements the carry decision logic truth table of FIG. 3B. Thus, depending upon the logic state of inputs A and B, Carry One (CO), Carry Propagate (CP) and Carry Zero (CZ) have the logic states shown in FIG. 3B. Carry Propagate is AND'ed with IRM and Not Bypass (complement of Bypass) at AND gate 132. Not Bypass and Carry One are NAND'ed at NAND gate 134. Not IRM and Carry Propagate are AND'ed at AND gate 136. The output of AND gate 136 is OR'ed with Bypass on line 118 at OR gate 138. Not Bypass and Carry Zero are AND'ed at AND gate 140. MOS transmission gate 120 is either an open circuit or is coupled to voltage Vcc, which is 5v or 10v dc preferably. Buffer 114 either connects Carry In from line 110 to Carry Out on line 124 or is an open circuit. CMOS transmission gate 112 connects Carry In from line 110 to Carry Out on line 124 or is an open circuit. MOS transmission gate 122 is connected either to supply ground or is an open circuit.

Referring now to FIG. 4, a multiple bit adder is shown generally at 200. The multiple bit adder is configured of a plurality of basic adder cells, each of which is of the type described with reference to FIGS. 3A and 3B. In the example shown by FIG. 4, eight basic adder cells 202, 204, 206, 208, 210, 212, 214 and 216 are connected in series to operate upon a Carry In or line 218 and to derive a Carry Out on line 220. This example assumes that $IRM_{7-0} = 1000, 1000_2$. Adder cells 202, 204, 206, 210 and 214 each may therefore activate a transmission gate from the cell Carry In to Carry Out, gates 222, 224, 226, 228, 230 and 232 respectively, each being of the type described with reference to gate 112 of FIG. 3A. Adder cells 208 and 216 each may activate a buffer from the cell Carry In to Carry Out, buffers 234 and 236 respectively, each being of the type described with reference to buffer 114 of FIG. 3A.

The A and B logical inputs for worst case propagation delay to cells 202 through 216, shown as $A_0$ and $B_0$ for cell 202 through $A_7$ and $B_7$ for cell 216, are shown in Table 1. The table also shows $IRM_0$ through $IRM_7$, which minimizes this delay, and $Bypass_0$ through $Bypass_7$, which select all cells to participate in the addition.

TABLE 1

| $A_7$ | $A_6$ | $A_5$ | $A_4$ | $A_3$ | $A_2$ | $A_1$ | $A_0$ |
|---|---|---|---|---|---|---|---|
| 1 | 1 | 1 | 1, | 1 | 1 | 1 | 1 |
| $B_7$ | $B_6$ | $B_5$ | $B_4$ | $B_3$ | $B_2$ | $B_1$ | $B_0$ |
| 1 | 1 | 1 | 1, | 1 | 1 | 1 | 1 |
| $IRM_7$ | $IRM_6$ | $IRM_5$ | $IRM_4$ | $IRM_3$ | $IRM_2$ | $IRM_1$ | $IRM_0$ |
| 1 | 0 | 0 | 0, | 1 | 0 | 0 | 0 |
| $Bypass_7$ | $Bypass_6$ | $Bypass_5$ | $Bypass_4$ | $Bypass_3$ | $Bypass_2$ | $Bypass_1$ | $Bypass_0$ |
| 0 | 0 | 0 | 0, | 0 | 0 | 0 | 0 |

The transmission gates and buffers are represented by Table 1 which result from:

$$IRM_{7-0} = 1000, 1000_2$$

and for a worst case carry propagation path, where:

$$B_{7-0} = A_{7-0} = 1111, 1111_2.$$

The propagation delay from Carry In on input 218 to Carry Out at output 220, assuming that logical inputs $A_{7-0}$ and $B_{7-0}$ are stable, and assuming a minimum size, 4-micron design rule, CMOS integrated circuit operating at 5-volts, is about three nanoseconds (3 nS) for the first transmission gate 222, 4 nS for the second gate 224, 5 nS for the third gate 226, plus 10 nS per buffer, for a total propagation delay of two times 22 nS, or 44 nS, compared to eight times 10 nS or 80 nS, if all buffers were to be used. The sums $\Sigma_0$ through $\Sigma_7$ are typically coupled to the input of a memory whose outputs are the source of inputs $A_0$ through $A_7$ and $B_0$ through $B_7$. The sum may thus be used in subsequent calculations. The Carry Out is typically coupled to the input of the next section of the adder for an adder that has more than eight bits, or to a flip flop for storage for use in subsequent calculations. $IRM_0$ through $IRM_7$ are typically obtained from a register that is loaded by the system controller when word sizes are changed. $Bypass_0$ through $Bypass_7$ are typically obtained from a register that is loaded by the system controller when defects are detected or when bits are otherwise to be excluded from an operation.

The circuit performance for all transmission gates of adder 200 yields a very slow rise and fall time signal and has a resulting propagation delay time for 8-bits comparable to a circuit having all buffers instead of transmission gates.

Referring now to FIG. 5, a block diagram of a multiple bit adder of the type which may advantageously be used in an associative processor is illustrated generally at 300. Each of the basic adder cells 302, 304, 306, 308, 310, 312, 314 and 316 is of the type described with reference to FIG. 3A. It is desired that one of the center bits not participate in the addition process, but that the remaining bits be added. The non-participating bit is called the "bypassed bit", and by way of example, will occur in adder 308. The bypassed bit is omitted from the addition either because it or that bit of the adder is faulty or because inputs $A_{7-0}$ and $B_{7-0}$ have a peculiar bit in the middle of them that is not to be added. Such a peculiar bit might for example be a status bit in a telemetry application.

Wherever the bypassed bit is located, it is important that CARRY IN is passed through the bypassed bit of the adder without depending upon the A and B inputs to that bypassed bit to do so. The signal bypass coupled to the adder is set true (logic 1) when a bit is to be left out. FIG. 3 illustrates how the Bypass signal is coupled to the basic adder. The Bypass signal may come from a register that is external to the adder. Similarly, the Impedance Restoration Mask (IRM) may come from an external register. The transmission gate 112 of FIG. 3A is turned ON and all other elements 120, 114 and 122 of the basic adder of FIG. 3A are turned OFF whenever the Bypass signal is true (logic 1).

The basic adder cells 302, 304, 306, 308, 312 and 314 may actuate transmission gates 318, 320, 322, 324, 326 and 328 respectively. Adder cells 310 and 316 may activate buffers 330 and 332 respectively. When the Bypass bit to a cell is false, the choice of whether a cell may activate a buffer or a transmission gate is determined by $IRM_{7-0}$. A transmission gate is turned ON when the Bypass signal is true (logic 1). While the enabling of a transmission gate is usually preferable to the buffer because the transmission gate is faster than the buffer, it is noted that the buffer could be enabled rather than the transmission gate if so desired.

FIG. 5 is illustrative of an Impedance Restoration Mask (IRM) that enables buffer 330 in the bit following the bypassed bit. If the bit (denoted by X) were not bypassed, the buffer or transmission gate in adder 308 would have otherwise been enabled. This bypassing of a faulty bit functions to minimize the number of adder bits in a series, thereby maintaining a high speed of data propagation.

The A and B logical inputs to adder cells 302 through 316, shown as $A_0$ and $B_0$ for cell 302 through $A_7$ and $B_7$ for cell 316 are shown in Table II, as are $IRM_0$ through $IRM_7$ and $Bypass_0$ through $Bypass_7$.

TABLE II

| $A_7$ | $A_6$ | $A_5$ | $A_4$ | $A_3$ | $A_2$ | $A_1$ | $A_0$ |
|---|---|---|---|---|---|---|---|
| 1 | 1 | 1 | 1 | X | 1 | 1 | 1 |
| $B_7$ | $B_6$ | $B_5$ | $B_4$ | $B_3$ | $B_2$ | $B_1$ | $B_0$ |
| 1 | 1 | 1 | 1 | X | 1 | 1 | 1 |
| $IRM_7$ | $IRM_6$ | $IRM_5$ | $IRM_4$ | $IRM_3$ | $IRM_2$ | $IRM_1$ | $IRM_0$ |
| 1 | 0 | 0 | 1 | 0 | 0 | 0 | 0 |
| $Bypass_7$ | $Bypass_6$ | $Bypass_5$ | $Bypass_4$ | $Bypass_3$ | $Bypass_2$ | $Bypass_1$ | $Bypass_0$ |
| 0 | 0 | 0 | 0 | 1 | 0 | 0 | 0 |

The sums $\Sigma_0$ through $\Sigma_6$, and $\Sigma_x$, are coupled to the input of a memory whose outputs are $A_0$ through $A_7$ and $B_0$ through $B_7$. The sum $\Sigma_{0-6}$ may thus be used in subsequent calculations. The sum $\Sigma_x$ from adder 308 may also be discarded. The CARRY IN on line 334 is derived from the Carry Out of a previous stage, or may be connected to a variety of sources such a logic 0 for "add A to B with no carry in", or a Carry flip-flop for "add A to B with carry flipflop". The CARRY OUT on line 336 is coupled to the input of the next section of the adder for an adder with more than eight bits, or to a flip-flop for storage for use in subsequent calculations. $IRM_0$ through $IRM_7$ and $Bypass_0$ through $Bypass_7$ are derived from registers that are loaded by the system controller when word sizes are changed, defects are detected, or bits are otherwise excluded from an operation.

The technique of the present invention is applicable to other logic circuits than adders, and is generally applicable to any functional logic unit having an input, an operation performed, and an output which is passed on to the next stage. For example, a series connection of exclusive OR gates may have a bit left out of an operation. A bit is left out by setting the Bypass signal true (logic 1) to the particular functional logical unit implementing the exclusive OR function.

In accordance with the present invention, a set of values for the Impedance Restoration Mask is chosen to minimize the worst case signal propagation time. The choice depends upon the LSI circuit fabrication technique, interface considerations between cells, and upon the data word size. It is assumed in the example of FIG. 4 that only every fourth buffer may need to be activated, leaving the three intervening transmission gates potentially active. The value of the Impedance Restoration Mask may be loaded into a register which sends the information to the adder at run time, or may be hardwired at the time of manufacture, depending upon the reconfigurability of the circuit. Arbitrarily long adder chains can be fabricated, and the propagation delay time resulting from the optimum usage of buffers is only a small fraction of the time required fo an all-buffer or all-transmission gate implementation.

I claim:

1. An arithmetic adder including:
   sum circuit means having first and second data inputs, a carry input and a summation output;
   carry circuit means responsive to said carry input of said sum circuit means for providing a carry signal path having a selectable propagation delay time means for selecting a propagation delay time in accordance with configuration dependent information and fault location information; and
   carry decision logic circuit means coupled to said carry circuit means and responsive to said first and second data inputs for connecting carry instructions to said carry circuit.

2. An arithmetic adder in accordance with claim 1 wherein said first and second data inputs are each single bit data words.

3. An arithmetic adder in accordance with claim 1 wherein said carry circuit means includes:
   transmission gate switch means having a propagation delay associated therewith;
   buffer circuit means having a greater propagation delay than said transmission gate switch; and
   logic means associated with said carry decision logic circuit for coupling Carry In through said adder via either said transmission gate or said buffer in accordance with said configuration dependent information and said fault location information.

4. An arithmetic adder in accordance with claim 3 wherein said transmission gate switch means comprises pass transistors.

5. An arithmetic adder in accordance with claim 3 wherein said buffer is comprised of non-inverting amplifier.

6. An arithmetic adder in accordance with claim 3 wherein said adder is configured in MOS logic.

7. An arithmetic adder in accordance with claim 3 further including:
   means for excluding a data bit connected to said adder from participating in the addition process, while adding all other data bits connected thereto.

8. A multiple bit adder comprised of a plurality of serially connected single bit adders each having two selectable signal paths therein, one of said paths being through a transmission gate switch transistor and the other through a buffer, for propagating a Carry In through said adders to a Carry Out and for deriving a summation signal at each of said serial connected adders, comprising:
   means for connecting multi-bit logic input words A and B to said multiple bit adder such that one bit of A and one bit of B is coupled to each serially connected adder;
   means for connecting a multi-bit impedance restoration mask logic input to said multi-bit adder such that one bit of said multi-bit impedance restoration mask is coupled to each serially connected adder;
   means for connecting a multi-bit bypassed bit control signal to said multi-bit adder such that one bit of said bypassed control signal is connected to each serially connected adder; and
   means associated with each of said serially connected adders for passing said Carry In through said adder irrespective of the value of said A and B inputs from the adder having a bypassed bit; and
   means for connecting a single bit impendance restoration mask signal to each adder such that the Carry In propagation path through the serially connected adders is routed through a combination of transmission gates and buffers to minimize the propagation delay through said connected adders.

9. In an associative processor having a plurality of arithmetic cells, each of which cells includes an adder circuit; an improved arithmetic adder for minimizing interconnections between cells, said improved adder comprising:

sum circuit means having first and second data inputs, a carry input and a summation output;

carry circuit means responsive to said carry input of said sum circuit means for providing a carry signal path having means for providing any one of a plurality of selectable propagation delay times, said propagation delay times being selected in accordance with configuration dependent information and fault location information; and carry decision logic circuit means coupled to said carry circuit means and responsive to said first and second data inputs adapted to apply carry instructions to said carry circuit.

10. An arithmetic adder in accordance with claim 9 wherein said first and second data inputs are each single bit data words.

11. An arithmetic adder in accordance with claim 9 wherein said carry circuit means includes:

transmission gate switch means having a propagation delay associated therewith;

buffer circuit means having a greater propagation delay than said transmission gate switch; and logic means associated with said carry decision logic circuit and coupled to said transmission gate switch means and said buffer circuit means and adapted to apply Carry In through said adder via either said transmission gate or said buffer in accordance with said configuration dependent information and said fault location information.

12. An arithmetic adder in accordance with claim 11 wherein said transmission gate switch means comprises pass transistors.

13. An arithmetic adder in accordance with claim 11 wherein said buffer is comprised of non-inverting amplifier.

14. An arithmetic adder in accordance with claim 11 wherein said adder is configured in MOS logic.

15. An arithmetic adder in accordance with claim 11 further including:

means for excluding a data bit connected to said adder from participating in the addition process, while adding all other data bits connected thereto.

* * * * *